Sept. 27, 1932.  E. E. DILLMAN  1,879,604
MEANS AND METHOD FOR WELDING TANKS
Filed June 15, 1931
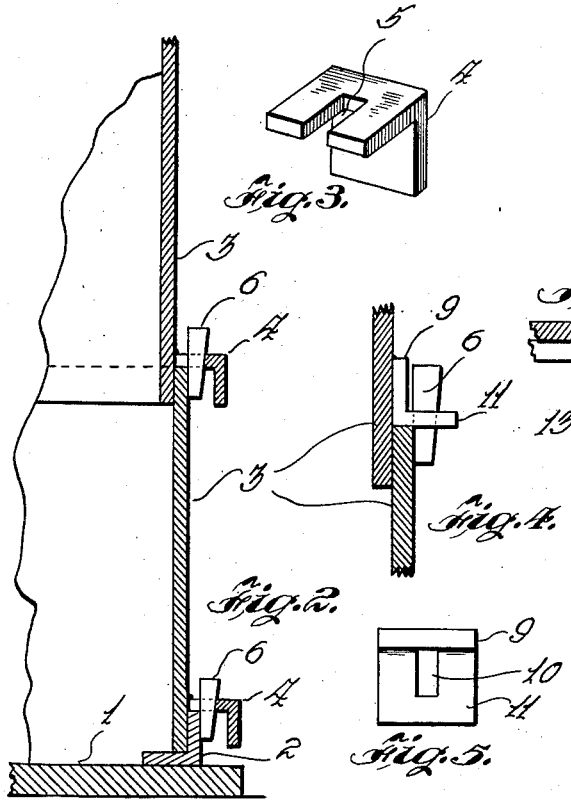
INVENTOR.
Edward E. Dillman,
BY John M. Spellman,
ATTORNEY.

Patented Sept. 27, 1932

1,879,604

UNITED STATES PATENT OFFICE

EDWARD E. DILLMAN, OF DALLAS, TEXAS

MEANS AND METHOD FOR WELDING TANKS

Application filed June 15, 1931. Serial No. 544,522.

This invention relates to improvements in means and method for the welding of oil tanks, water tanks, or containers for any substance to be contained therein.

One of the objects of the invention is the provision of means for the fitting up and holding of the plates firmly in position preparatory to the welding of the plates into a tank bin or container in the field where the tank or container is to be used.

A further object of the invention is the method combined with the means in the form of special clips or wedge clamps whereby the plates are assembled in proper over-lapping position in the formation of the joints where one plate abuts another plate. That is, the proper gauging of the width of a lap joint in the field without any shop or factory work on the plates, such as punching, burning or the cutting of holes in adjacent plates whether the seam or joint is vertical or horizontal, straight or curved. The result is that a tank having the plates so assembled and when welded is tight and will hold liquids without loss or of loss of the gases normally to be held in the tank.

With the above and other objects in view, the invention will be thoroughly understood from a perusal of the following detailed description, taken in connection with the accompanying drawing, and wherein:

Figure 1 represents in part an oil tank in broken formation and parts removed for convenience of illustration and for the purpose of showing the joints of adjacent plates, and embodying the invention.

Figure 2 is a fragmentary sectional view of the wall of a completed tank, showing the application of the wedge clamps in position on adjacent plates and the manner of connecting the plates by means of the wedge clamps.

Figure 3 is a perspective view of one of the members of the clamp.

Figure 4 is a detail sectional view through the wall of a tank showing the joint of two adjacent plates thereof and secured together by the two clamp members, one of said members being modified from that shown in Figure 2.

Figure 5 is a top plan view of one of the clamp members shown in Figure 4.

Figure 6 is a top plan view of the two clamp members shown in Figure 2 as applied to the tank plates.

Figure 7 is a perspective view of one form of wedge constituting one of the clamp members.

Figure 8 is a view similar to that of Figure 6, but illustrating a different or modified form of the clamp members as applied to two tank plates, and Figure 9 is a perspective view of one of the clamp members shown in Figure 8.

Referring to the drawing more in detail, 1 denotes the bottom or base of tank with an annular flange 2, and 3 denotes the plates of the tank.

In Figure 2 is shown the over-lapped edges of two tank plates joined together by the clamp members, One of these members is shown in Figure 3 and consists of an angular clamp plate with a recess 5 for the insertion of a wedge 6. This form of clamp is shown as applied to the tank plate, the member 4 being welded to the tank plate with the wedge 6 forced into the recess 5, the wedge bearing against the outside of the lower plate and between this plate and the inside wall of the recess, thus making a tight and secure fastening. The wedge forming one of the clamp members tapers from top to lower end and may be of rectangular shape as shown in Figure 8, or of any desired or irregular shape suitable for the occasion. In Figure 1 is shown the application of the clamp members to both horizontal and vertical joints of the tank plates.

Referring to Figures 4 and 5, a modification of the clamp member, in this instance the member 9 has a rectangular recess 10 placed in the lower part of the member as at 11, and the upper portion 9 bears against the outside of the tank plate and the underside of the portion 11 rests upon the edge of the adjacent tank plate. The wedge member 6 is then driven home and effectually holds the two plates in position for welding.

In Figures 8 and 9 is illustrated a further modification of the wedge clamp members.

In this instance one of the members 12 has a circular opening 13 and a straight walled recess 14 and when welded to the side of the upper plate or plates 3 of the tank, a rectangular shaped wedge 6 is driven into position as shown in Figure 8.

These clamp members may be welded to the flat tank plates in the field or other point removed from the normal operating point of manufacture. The method and the means for carrying it into practice results in a substantial saving in the construction of lap-welded tanks, bins or containers, by the elimination of the punching, cutting or burning of holes in the tank plates prior to welding.

The invention is not to be understood as being restricted to any particular form or shape of clamp members such as the angular plates and the wedges, but may be further modified to come within the spirit and scope of the appended claims.

What is claimed as new is:

1. A method for holding and fitting the plates of tanks in position prior to the lap welding of the plates into a tank, which consists of welding a clamp member to the sides of the tank plates adjacent to the edges of the plates with the tank plates over-lapped to form a joint, and inserting a wedge member in the clamp member to cause the two adjacent overlapped edges of the tank plates to be held firmly in position for welding.

2. A method for preparing plates in the construction of container tanks for assembly in a field removed from the point of manufacture of the plates, which consists of welding a clamp member in spaced relation to the marginal edges of the tank plates and forcing a wedge member through the clamp member to bring the adjacent plates of the tank in an overlapped relation to form an over lap joint.

3. A device for holding tank plates in position prior to the lap welding of the plates into a tank, comprising a wedge member, a clamp member having a recess for reception of the wedge member, said clamp member being welded to the marginal outer peripheral sides of the tank plates to allow the adjacent plates being joined to be over-lapped, said wedge member causing the plates to bear against one another at the joint when driven home.

4. A device for holding tank plates in position and as claimed in claim 3, said clamp member having one surface thereof adapted to be welded to one of the tank plates in a position to permit one surface of the member to rest upon the next lower or adjacent tank plate of horizontal over-lapped or vertical overlapped relation of the plates so that the wedge members will have frictional contact with one of the tank plates and the walls of said recess.

5. The method of constructing tanks, comprising securing to tank plates L shaped members having opening therein, inserting a tapered wedge in the opening in the L shaped members to bring the plates into close contact relationship, and welding the plates to form a tank.

6. The mehod of constructing tanks and the like, which includes the steps of securing to plates near one marginal edge an L shaped member, assembling the plates so that the plate edges overlap, forcing a wedge through an opening in the L shaped members to bring the over-lapped edges of the plates into close contact, and welding the plates together while they are held in the contact relationship.

7. A device for holding tank plates in assembled position so as to enable the plates to be welded, consisting of an L shaped member adapted to be secured to the tank plates near the marginal edge but at such a distance from the edge as to permit the plates to overlap, and a wedged shaped member adapted to be inserted through an opening in the L shaped members to bring the plates into close contact so as to permit welding of the plates.

In testimony whereof I affix my signature.

EDWARD E. DILLMAN.